US011481849B1

(12) United States Patent
Ketharaju et al.

(10) Patent No.: US 11,481,849 B1
(45) Date of Patent: Oct. 25, 2022

(54) VIRTUAL WALLET INSURANCE

(71) Applicant: Wells Fargo Bank, N.A., San Francisco, CA (US)

(72) Inventors: Rameshchandra Bhaskar Ketharaju, Hyderabad (IN); Ramya Balasubramanian, Secunderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 231 days.

(21) Appl. No.: 17/004,837

(22) Filed: Aug. 27, 2020

Related U.S. Application Data

(63) Continuation of application No. 15/098,030, filed on Apr. 13, 2016, now Pat. No. 10,776,876.

(51) Int. Cl.
*G06Q 40/08* (2012.01)
*G06Q 20/36* (2012.01)

(52) U.S. Cl.
CPC ............ *G06Q 40/08* (2013.01); *G06Q 20/36* (2013.01)

(58) Field of Classification Search
CPC ....... G06Q 40/08; G06Q 40/025; G06Q 10/67
See application file for complete search history.

(56) References Cited

U.S. PATENT DOCUMENTS

| 7,107,247 | B2 | 9/2006 | Kinoshita et al. |
| 7,708,194 | B2 | 5/2010 | Vawter |
| 7,974,861 | B1 | 7/2011 | Bohanek |
| 8,126,745 | B1 | 2/2012 | Bohanek |
| 8,423,462 | B1 | 4/2013 | Amacker et al. |
| 8,577,803 | B2 | 11/2013 | Chatterjee et al. |
| 9,082,119 | B2 | 7/2015 | Ortiz et al. |
| 2002/0194119 | A1 | 12/2002 | Wright et al. |
| 2003/0110126 | A1 | 6/2003 | Dunkeld et al. |
| 2008/0048022 | A1 | 2/2008 | Vawter |
| 2008/0103841 | A1 | 5/2008 | Lewis et al. |
| 2010/0293090 | A1 | 11/2010 | Domenikos et al. |
| 2012/0116820 | A1 | 5/2012 | English et al. |
| 2013/0110658 | A1 | 5/2013 | Lyman et al. |
| 2013/0159154 | A1 | 6/2013 | Purves et al. |
| 2013/0211990 | A1 | 8/2013 | Zhong |

(Continued)

OTHER PUBLICATIONS

Powell, "The Difference Between Digital and Virtual Currency", Jan. 6, 2017, 8 pages.

(Continued)

*Primary Examiner* — Scott S Trotter
(74) *Attorney, Agent, or Firm* — Shumaker & Sieffert, P.A.

(57) ABSTRACT

Techniques are described for providing insurance coverage for a virtual wallet stored on a computing device. The virtual wallet has a value equal to a sum of assigned values of a plurality of virtual financial assets included in the virtual wallet. A user of the computing device purchases an insurance policy for the virtual wallet with an insured amount based on the value of the virtual wallet. The computing device is configured to send messages to an insurance server reporting an updated value of the virtual wallet based on changes to the assigned values of the virtual financial assets. The insurance server updates the insured amount of the insurance policy based on the updated value of the virtual wallet. Upon the virtual wallet being compromised, the insurance policy has an insured amount equal to the most recent updated value of the virtual wallet.

20 Claims, 5 Drawing Sheets

(56) References Cited

U.S. PATENT DOCUMENTS

| | | |
|---|---|---|
| 2013/0290234 A1 | 10/2013 | Harris et al. |
| 2014/0195424 A1 | 7/2014 | Zheng et al. |
| 2014/0337230 A1 | 11/2014 | Bacastow |
| 2014/0365350 A1 | 12/2014 | Shvarts |
| 2016/0188317 A1 | 6/2016 | Hilliar et al. |
| 2016/0217532 A1 | 7/2016 | Slavin |
| 2016/0267280 A1 | 9/2016 | Mansour et al. |
| 2017/0024828 A1 | 1/2017 | Michel et al. |
| 2017/0178237 A1* | 6/2017 | Wong .................... G06Q 40/04 |

OTHER PUBLICATIONS

FATF Report, "Virtual Currencies Key Definitions and Potential AML/CFT Risks", Jun. 2014, 17 pages.
Prosecution History from U.S. Appl. No. 15/098,030, dated Feb. 8, 2019-May 14, 2020, 79 pp.
U.S. Appl. No. 15/098,030, filed Apr. 13, 2016.

* cited by examiner

VIRTUAL WALLET INSURANCE

This application is a continuation of U.S. application Ser. No. 15/098,030, filed Apr. 13, 2016, the entire content of which is incorporated herein by reference.

TECHNICAL FIELD

The disclosure relates to virtual wallet systems.

BACKGROUND

In general, a virtual wallet refers to an application running on a computing device that allows a user of the computing device to perform online transactions. A computing device configured to execute a virtual wallet application may be any of a wide range of devices, including laptop or desktop computers, tablet computers, so-called "smart" phones, "smart" pads, "smart" watches, or other personal digital appliances equipped for wired or wireless communication. In some examples, the virtual wallet may be used to purchase goods or services via either a website or a point-of-sale device configured to receive online payments.

A virtual wallet includes one or more virtual financial assets, which may correspond to any type of digitized asset that has a monetary value. Commonly, a virtual wallet includes one or more virtual credit accounts, virtual banking accounts, virtual currency accounts, or other liquid virtual assets that can be used to purchase goods and services. In some examples, a virtual wallet may also include non-liquid virtual assets, such as virtual stock and bond certificates; virtual ownership titles for real estate, automobiles, and other property; and virtual event tickets or other virtual documents having a monetary value. In other examples, a virtual wallet may include virtual identification documents.

In the above examples, the virtual wallet includes sensitive information that needs to be kept secure. Like all technology, however, virtual wallets have security risks. For example, a virtual wallet may be compromised if the virtual wallet is accessed by an unauthorized user, or if the computing device that stores the virtual wallet is lost, stolen, destroyed, or accessed by an authorized user. Unlike a stolen credit card, if the virtual wallet is compromised, there may be no way for a user to recover the virtual financial assets included in the virtual wallet.

SUMMARY

In general, this disclosure describes techniques for providing insurance coverage for a current monetary value of a virtual wallet stored on a computing device. A virtual wallet may include a plurality of virtual financial assets each having an assigned value. A value of the virtual wallet may be equal to the sum of the assigned values of the plurality of virtual financial assets. According to the techniques of this disclosure, a user of the virtual wallet may purchase an insurance policy for the virtual wallet with an initial insured amount based on the value of the virtual wallet. After the virtual wallet is insured, the assigned values of the plurality of virtual financial assets in the virtual wallet may change, e.g., as the virtual financial assets are used to purchase goods or services or as market values fluctuate. The value of the virtual wallet is then updated based on the changes to the assigned values of the virtual financial assets included in the virtual wallet.

The disclosed techniques enable continuous tracking of the virtual wallet by configuring the computing device to send ad hoc messages to an insurance server reporting the updated value of the virtual wallet. The insurance server, in turn, updates the insured amount for the virtual wallet based on the updated value of the virtual wallet. In this way, upon the virtual wallet being compromised, the insurance policy for the virtual wallet has an insured amount equal to the most recent updated value of the virtual wallet as recorded by the insurance server.

In one example, this disclosure is directed to a method comprising storing, by a computing device, a virtual wallet that includes at least one virtual financial asset having an assigned value, the at least one virtual financial asset corresponding to a financial asset held by a financial institution; establishing, by the computing device and with an insurance company, an insurance policy for the virtual wallet with an insured amount based on a value of the virtual wallet, the value of the virtual wallet being equal to the assigned value of the at least one virtual financial asset included in the virtual wallet; updating, by the computing device, the value of the virtual wallet based on a change to the assigned value of the at least one virtual financial asset included in the virtual wallet; sending, by the computing device to the insurance company, a message reporting the updated value of the virtual wallet; and receiving, by the computing device and from the insurance company, an indication of an updated insured amount of the insurance policy based on the updated value of the virtual wallet.

In another example, this disclosure is directed to a computing device comprising one or more storage units configured to store a virtual wallet that includes at least one virtual financial asset having an assigned value, the at least one virtual financial asset corresponding to a financial asset held by a financial institution, and one or more processors in communication with the one or more storage units. The one or more processors are configured to establish an insurance policy with an insurance company for the virtual wallet with an insured amount based on a value of the virtual wallet, the value of the virtual wallet being equal to the assigned value of the at least one virtual financial asset included in the virtual wallet, update the value of the virtual wallet based on a change to the assigned value of the at least one virtual financial asset included in the virtual wallet, send a message to the insurance company reporting the updated value of the virtual wallet, and receive an indication from the insurance company of an updated insured amount of the insurance policy based on the updated value of the virtual wallet.

In a further example, this disclosure is directed to a method comprising receiving, by an insurance server of an insurance company and from a computing device, a request for an insurance policy for a virtual wallet stored on the computing device, wherein the request includes a value of the virtual wallet, the value of the virtual wallet being equal to an assigned value of at least one virtual financial asset included in the virtual wallet, the at least one virtual financial asset corresponding to a financial asset held by a financial institution; storing, by the insurance server, the insurance policy for the virtual wallet with an insured amount based on the value of the virtual wallet; receiving, by the insurance server and from the computing device, a message reporting an updated value of the virtual wallet, the updated value of the virtual wallet being based on a change to the assigned value of the at least one virtual financial asset included in the virtual wallet; and updating, by the insurance server, the insured amount of the insurance policy based on the updated value of the virtual wallet.

In an additional example, this disclosure is directed to an insurance server of an insurance company comprising one or more storage units configured to store virtual wallet insurance policies, and one or more processors in communication with the one or more storage units. The one or more processors are configured to receive a request from a computing device for an insurance policy for a virtual wallet stored on the computing device, wherein the request includes a value of the virtual wallet, the value of the virtual wallet being equal to an assigned value of at least one virtual financial asset included in the virtual wallet, the at least one virtual financial asset corresponding to a financial asset held by a financial institution, store the insurance policy for the virtual wallet in the one or more storage units with an insured amount based on the value of the virtual wallet, receive a message from the computing device reporting an updated value of the virtual wallet, the updated value of the virtual wallet being based on a change to the assigned value of the at least one virtual financial asset included in the virtual wallet, and update the insured amount of the insurance policy based on the updated value of the virtual wallet.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
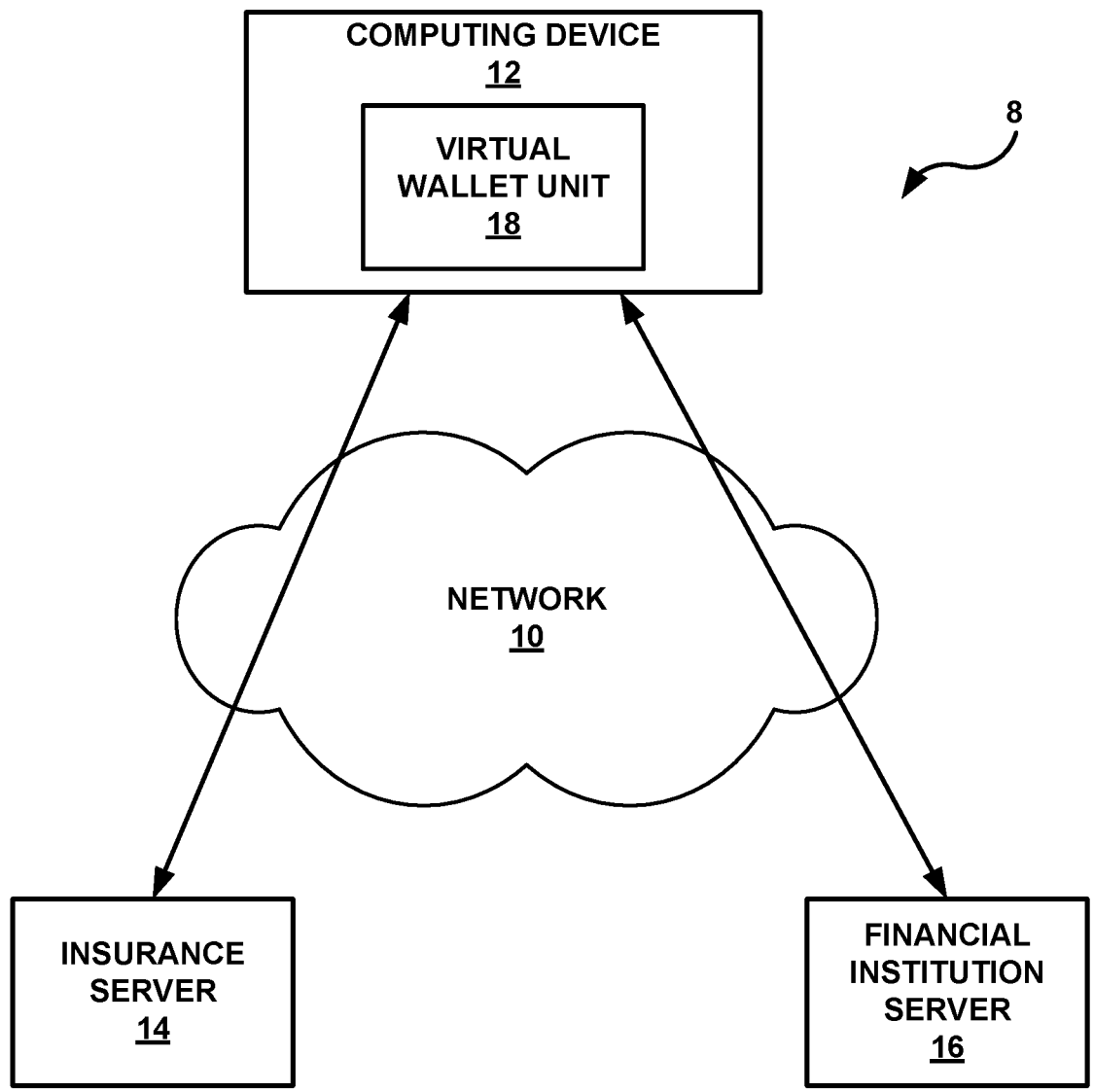
FIG. 1 is a block diagram illustrating an example virtual wallet system configured to provide insurance coverage for a current monetary value of a virtual wallet stored on a computing device, in accordance with the techniques of this disclosure.

FIG. 1 is a block diagram illustrating an example virtual wallet system 8 configured to provide insurance coverage for a current monetary value of a virtual wallet stored on a computing device 12, in accordance with the techniques of this disclosure. As illustrated in FIG. 1, virtual wallet system 8 includes a computing device 12 with a virtual wallet unit 18 that manages a virtual wallet used to perform online transactions, insurance server 14 associated with an insurance company, and a financial institution server 16 associated with a financial institution that are all in communication via a network 10.

Computing device 12 may comprise any of a wide range of user devices, including laptop or desktop computers, tablet computers, so-called "smart" phones, "smart" pads, "smart" watches, or other personal digital appliances equipped for wired or wireless communication. Computing device 12 may include at least one user interface device (not shown) that enables a user of computing device 12 to interact with computing device 12. In some examples, the user interface device of computing device 12 may be configured to receive tactile, audio, or visual input. In addition to receiving input from the user, the user interface device of computing device 12 may be configured to output content such as a graphical user interface (GUI) for display, e.g., at a display device associated with computing device 12.

Computing device 12 may include one or more processors configured to execute virtual wallet unit 18. For example, virtual wallet unit 18 may be implemented as a downloadable or pre-installed application or "app" that is executed by the one or more processors of computing device 12. Virtual wallet unit 18 manages a virtual wallet stored on computing device 12 used to perform online transactions. In some examples, a user of computing device 12 may use the virtual wallet to purchase goods or services via either a website or a point-of-sale device configured to receive online payments. The virtual wallet stored on computing device 12 includes one or more virtual financial assets, which may correspond to any type of digitized financial asset with a monetary value that is held at a financial institution. To perform online transactions using the virtual wallet, virtual wallet unit 18 of computing device 12 may send messages to a financial institution server 16 associated with the financial institution for authorization of the transactions.

In one example, the virtual wallet stored on computing device 12 may include one or more virtual credit accounts, virtual banking accounts, virtual currency accounts, or other liquid virtual assets that can be used to purchase goods and services. In another example, the virtual wallet may include non-liquid virtual assets, such as virtual stock and bond certificates; virtual ownership titles for real estate, automobiles, and other property; and virtual event tickets or other virtual documents having a monetary value. In some cases, the virtual wallet stored on computing device 12 may be used not just for basic financial transactions but also to authenticate the user's credentials. For example, the virtual wallet may include virtual identification documents, such as a driver's license, health insurance card, and other ID documents. In this example, the virtual identification documents could be used to verify the identity of the user when making a purchase via the virtual wallet, or to verify the age of the user when purchasing alcohol or other age-restricted items.

In some instances, virtual wallet unit 18 is an application provided and supported by the financial institution that holds the associated financial assets, such as the financial institution associated with financial institution server 16. In other instances, virtual wallet unit 18 is an application provided and supported by a third party application developer. As another example, virtual wallet unit 18 may be implemented as part of a hardware unit of computing device 12. Examples of computing device 12 and virtual wallet unit 18 are described in more detail below with respect to FIG. 2.

Financial institution server 16 is associated with the financial institution. Financial institution server 16 may be part of a centralized or distributed system of one or more computing devices of the financial institution, such as such as desktop computers, laptops, workstations, wireless devices, network-ready appliances, file servers, print servers, or other devices. In the case of a distributed system of the financial institution, the system may include a distributed ledger or distributed database, similar to block chain technology. The financial institution may be a traditional bank or credit union. The financial institution may hold one or more financial assets that are virtualized for inclusion in virtual wallet account managed by virtual wallet unit 18 of computing device 12. The financial institution may provide authorization of transactions performed using the virtual wallet stored on computing device 12. In some examples, the financial institution may provide and support virtual wallet unit 18 executed by computing device 12. Financial institution server 16 facilitates communication between computing device 12 and the financial institution.

Insurance server 14 is associated with the insurance company. Insurance server 14 may be part of a centralized or distributed system of one or more computing devices of the insurance company, such as such as desktop computers, laptops, workstations, wireless devices, network-ready appliances, file servers, print servers, or other devices. In the case of a distributed system of the insurance company, the system may include a distributed ledger or distributed database, similar to block chain technology. In some examples, the insurance company may be a stand-alone insurance company that offers a variety of insurance policies, such as automobile insurance policies, homeowners' insurance policies, life insurance policies, disability insurance policies, and virtual wallet insurance policies. In other examples, the insurance company may be part of the financial institution that holds the financial assets associated with virtual wallet unit 18 of computing device 12. If the insurance company is part of the financial institution, the insurance company may only offer insurance policies to cover products offered by the financial institution, e.g., virtual wallet insurance policies. Insurance server 14 facilitates communication between computing device 12 and the insurance company. An example of insurance server 14 is described in more detail below with respect to FIG. 3.

As illustrated in FIG. 1, computing device 12 may communicate with insurance server 14 and financial institution server 16 over a network 10. In some examples, network 10 may comprise a private network associated with the financial institution of the insurance company. In other examples, network 10 may comprise a public network, such as the Internet. Although illustrated as a single entity, network 10 may comprise a combination of public and/or private networks. In some examples, network 10 may comprise one or more of a wide area network (WAN) (e.g., the Internet), a local area network (LAN), a virtual private network (VPN), or another wired or wireless communication network. Computing device 12, insurance server 14, and financial institution server 16 may perform transactions with each other over network 10 using "smart" contracts. The smart contracts may be software logic executed by each of computing device 12, insurance server 14, and financial institution server 16 used to manage or facilitate elements of the transactions. The smart contracts may be publicly or privately permissioned.

In general, virtual wallets are a viable alternative for users who are wary of spreading their credit or bank account information across various websites. In just a few years, virtual wallets have gone main stream, and more and more people are using virtual wallets to pay their bills, shop online, book tickets, and the like, based on the comfort and ease the virtual wallet brings to such transactions. For example, if a user wants to make a person-to-person transaction, using a virtual wallet is quicker than sending a check through the mail. Thus, virtual wallets may eventually replace physical wallets.

Like all technology, however, virtual wallets have security risks. In the above examples, the virtual wallet stored on computing device 12 includes sensitive information that needs to be kept secure. The virtual wallet may be compromised if the virtual wallet is accessed by an unauthorized user, or if computing device 12 that stores the virtual wallet is lost, stolen, destroyed, or accessed by an authorized user. When the virtual wallet is compromised, the user may lose possession of the funds present in the virtual wallet.

Conventionally, unlike a stolen credit card, if a virtual wallet is compromised, there was no way for a user to recover the value of any virtual financial assets included in the virtual wallet. This issue with conventional virtual wallets is rooted in the very technology that makes virtual wallets so appealing to users, i.e., easy access to financial assets via a user device. For example, providing quick and easy access to financial assets for the users may also make access relatively easy for unauthorized users. In addition, storing the virtual wallets on a user device, which may be a mobile device such as "smart" phones and "smart" pad, may make theft, loss, and damage relatively common.

The techniques of this disclosure continuously protect the user of computing device 12 from the risks associated with having a virtual wallet stored on computing device 12. Specifically, the techniques include continuous communication between virtual wallet unit 18 running on computing device 12 and an insurance server 14 associated with an insurance company in order to insure the virtual wallet against unauthorized access, theft, loss, or damage.

The virtual wallet stored on computing device 12 may be a single account that includes a plurality of virtual financial assets having individual assigned values. In this example, the virtual wallet has a value equal to the sum of the individual assigned values of the plurality of virtual financial assets. According to the techniques of this disclosure, virtual wallet unit 18 of computing device 12 is configured to communicate with insurance server 14 associated with the insurance company to establish an insurance policy for the virtual wallet. The user of the virtual wallet stored on computing device 12 may purchase the insurance policy for the virtual wallet with an initial insured amount based on the value of the virtual wallet. In some instances, the insurance policy may have an insured amount equal to the total value of the virtual wallet. In other instances, the insurance policy may have an insured amount equal to some percentage of the total value of the virtual wallet. In still other instances, the insurance policy may have an insured amount equal to the assigned value of at least one of the virtual financial assets included in the virtual wallet.

After the virtual wallet is insured, the assigned values of the plurality of virtual financial assets included in the virtual wallet may change, e.g., as the virtual financial assets are used to purchase goods or services or as market values fluctuate. Virtual wallet unit 18 updates the value of the virtual wallet stored on computing device 12 based on the changes to the assigned values of the plurality of virtual financial assets included in the virtual wallet.

The disclosed techniques enable continuous tracking of the virtual wallet stored on computing device 12 and updating of the insurance policy for the virtual wallet based on changes to the value of the virtual wallet. Computing device 12 and insurance server 14 may use smart contracts to track, modify, and update a ledger associated with the insurance policy. The ledger associated with the insurance policy may be a centralized ledger or a distributed ledger. For example, computing device 12 and insurance server 14 may execute one or more smart contracts to capture insurance details for the virtual wallet stored on computing device 12, identify and validate the virtual wallet stored on computing device 12 and the virtual financial assets included in the virtual wallet that are to be insured, and record the insured amount of the insurance policy for the virtual wallet into the ledger for the full duration and term of the insurance policy.

The smart contracts executed by computing device 12 and insurance server 14 may include logic to automatically update the insured amount based on the value of the virtual wallet that changes dynamically and update the insurance policy with the updated insured amount. In addition, the smart contracts may include logic to synchronize the collateral requirements between insurance server 14 and virtual wallet unit 18 of computing device 12 to continually track the changes to the value of the virtual wallet and the insured amount of the insurance policy for the virtual wallet. Upon the virtual wallet being compromised, the smart contracts may further include logic to finalize a last value of the virtual wallet and close out the insurance policy with a ledger posting based on the last value of the virtual wallet.

According to the techniques of this disclosure, virtual wallet unit 18 is configured to send ad hoc messages to insurance server 14 reporting the updated value of the virtual wallet. Virtual wallet unit 18 may send the ad hoc messages to insurance server 14 after each transaction performed using the virtual wallet, according to a periodic interval, or upon the virtual wallet being compromised. In response to the messages, insurance server 14 updates the insured amount of the insurance policy for the virtual wallet based on the updated value of the virtual wallet. In this way, if the virtual wallet is compromised, the insurance policy for the virtual wallet has an insured amount equal to the most recent updated value of the virtual wallet as recorded by insurance server 14.

The architecture of virtual wallet system 8 illustrated in FIG. 1 is shown for exemplary purposes only and should not be limited to this architecture. Virtual wallet system 8 illustrated in FIG. 1 shows a single computing device 12 in communication with a single insurance server 14 of the insurance company and a single financial institution server 16 of the financial institution. In other examples, virtual wallet system 8 may include multiple different computing devices having virtual wallet units that are each in communication one or more insurance servers of the insurance company and one or more financial institution servers of the financial institution. In still other examples, computing device 12 may be in communication with insurance servers of more than one insurance company and/or in communication with financial institution servers of more than one financial institution. For example, virtual wallet unit 18 of computing device 12 may manage multiple virtual wallet accounts that include virtual financial assets corresponding to financial assets held by more than one financial institution. In this example, the multiple virtual wallet accounts managed by virtual wallet unit 18 of computing device 12 may be insured by multiple different insurance companies.

Figure 2:
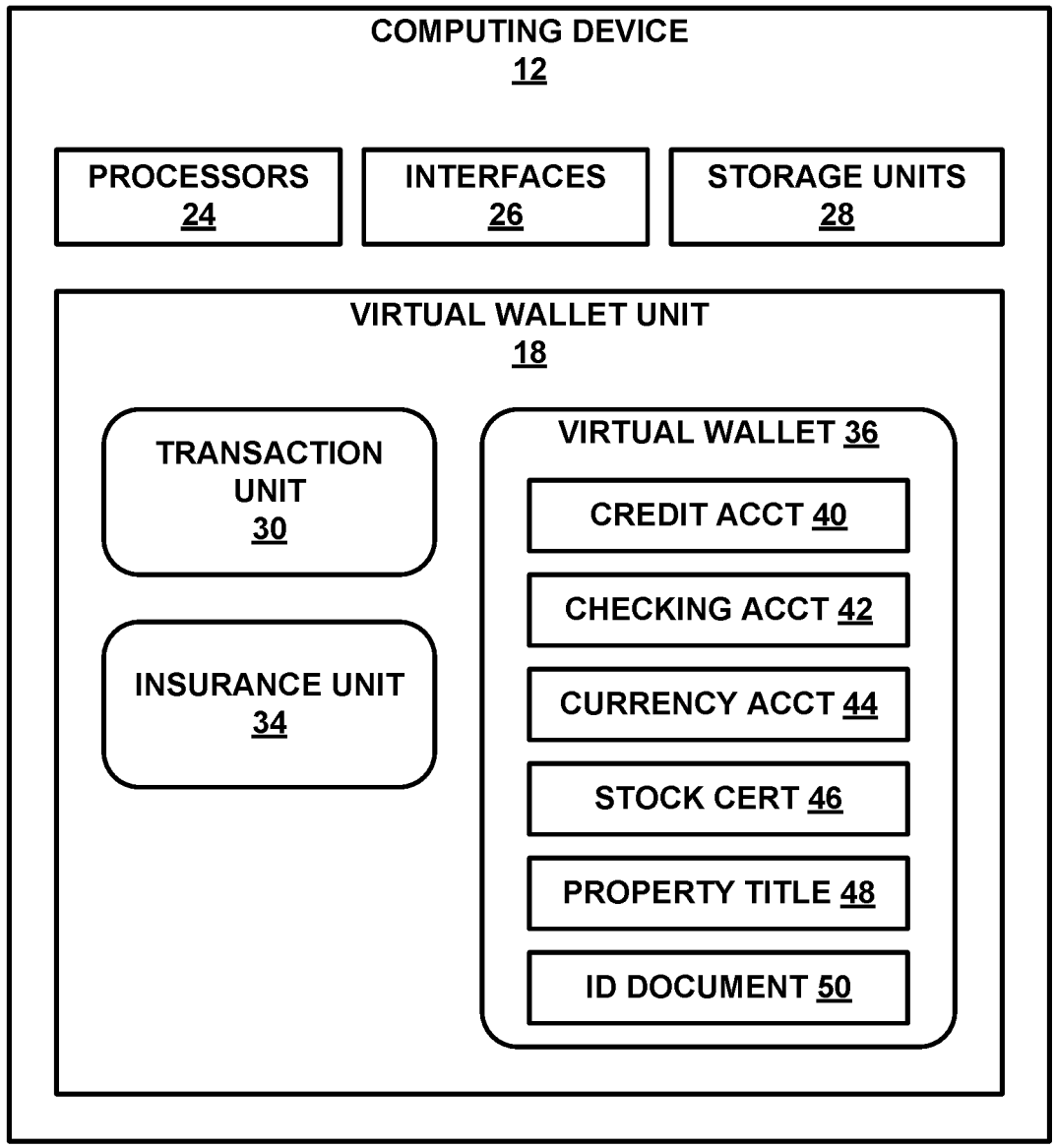
FIG. 2 is a block diagram illustrating an example computing device including a virtual wallet unit configured to communicate with an insurance server, in accordance with the techniques of this disclosure.

FIG. 2 is a block diagram illustrating an example of computing device 12 including virtual wallet unit 18 configured to communicate with insurance server 14, in accordance with the techniques of this disclosure. The architecture of computing device 12 illustrated in FIG. 2 is shown for exemplary purposes only and computing device 12 should not be limited to this architecture. In other examples, computing device 12 may be configured in a variety of ways.

As shown in the example of FIG. 2, computing device 12 includes one or more processors 24, one or more interfaces 26, and one or more storage units 28. Computing device 12 also includes virtual wallet unit 18, which may be implemented as program instructions and/or data stored in storage units 28 and executable by processors 24 or implemented as one or more hardware units or devices of computing device 12. Storage units 28 of computing device 12 may also store an operating system and a user interface unit executable by processors 24. The operating system stored in storage units 28 may control the operation of components of computing device 12. Although not shown in FIG. 2, the components, units or modules of computing device 12 are coupled (physically, communicatively, and/or operatively) using communication channels for inter-component communications. In some examples, the communication channels may include a system bus, a network connection, an inter-process communication data structure, or any other method for communicating data.

Processors 24, in one example, may comprise one or more processors that are configured to implement functionality and/or process instructions for execution within computing device 12. For example, processors 24 may be capable of processing instructions stored by storage units 28. Processors 24 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Storage units 28 may be configured to store information within computing device 12 during operation. Storage units 28 may include a computer-readable storage medium or computer-readable storage device. In some examples, storage units 28 include one or more of a short-term memory or a long-term memory. Storage units 28 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 28 are used to store program instructions for execution by processors 24. Storage units 28 may be used by software or applications running on computing device 12 (e.g., virtual wallet unit 18) to temporarily store information during program execution.

Computing device 12 may utilize interfaces 26 to communicate with external devices via one or more networks, e.g., network 10 from FIG. 1. Interfaces 26 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, computing device 12 utilizes interfaces 26 to wirelessly communicate with an external device such as insurance server 14 or financial institution server 16.

Computing device 12 may also utilize interfaces 26 to communicate with users of computing device 12. Interfaces 26 may be user interface (UI) devices configured to operate as both input devices and output devices. For example, the UI devices may be configured to receive tactile, audio, or visual input from a user of computing device 12. In addition to receiving input from a user, the UI devices may be configured to provide output to a user using tactile, audio, or video stimuli. In one example, the UI devices may be configured to output content for display, e.g., a graphical user interface (GUI), in accordance with a user interface unit stored in storage units 28. In this example, the UI devices may include a presence-sensitive display that displays a GUI and receives input from a user using capacitive, inductive, and/or optical detection at or near the presence sensitive display. Other examples of the UI devices include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples of the UI devices include a speaker, a cathode ray tube (CRT) monitor, a liquid crystal display (LCD), organic light emitting diode (OLED), or any other type of device that can generate intelligible output to a user.

Computing device 12 may include additional components that, for clarity, are not shown in FIG. 2. For example, computing device 12 may include a battery to provide power to the components of computing device 12. Similarly, the components of computing device 12 shown in FIG. 2 may not be necessary in every example of computing device 12.

In the example illustrated in FIG. 2, virtual wallet unit 18 includes a transaction unit 30, an insurance unit 34, and a virtual wallet 36. Virtual wallet 36 may comprise a single account that includes a plurality of virtual financial assets having individual assigned values. Each of the virtual financial assets included in virtual wallet 36 corresponds to a financial asset held by a financial institution. In other examples, virtual wallet unit 18 may include multiple virtual wallet accounts that are associated with different types of virtual financial assets, or multiple virtual wallet accounts that are associated with different financial institutions.

In general, virtual wallet 36 may be setup in virtual wallet unit 18 by a user of computing device 12. As an example, the user may input account or other identifying information into virtual wallet unit 18 for each of the virtual financial assets included in virtual wallet 36. Each of the virtual financial assets may be stored on computing device 12 as objects having a digital certificate. Virtual wallet unit 18 of computing device 12 may then exchange public/private key pairs with financial institution server 16 of the financial institution for each of the virtual financial assets in virtual wallet 36 to facilitate encryption and decryption of messages associated with the given one of the virtual financial assets. In addition, computing device 12 may execute a smart contract for each of the virtual financial assets to establish, track, and update an individual assigned value for each of the virtual financial assets. The smart contracts may manage or facilitate elements of transactions between virtual wallet 36 of computing device 12 and financial institution server 16 of the financial institution.

In the illustrated example, virtual wallet 36 includes a virtual credit account 40, a virtual checking account 42, a virtual currency account 44, a virtual stock certificate 46, a virtual property title 48, and a virtual ID document 50. Virtual property title 48 may comprise a title of ownership for real estate, automobiles, or other property. Virtual ID document 50 may comprise a driver's license, a health insurance card, or other ID documents. In other examples, virtual wallet 36 may include more or fewer virtual financial assets. For example, virtual wallet 36 may include one or more additional virtual credit accounts, virtual banking accounts, virtual currency accounts, or other liquid virtual assets that can be used to purchase goods and services. As another example, virtual wallet 36 may include one or more additional non-liquid virtual assets, such as virtual stock and bond certificates, virtual property titles, and virtual event tickets or other virtual documents having a monetary value.

Each of the virtual financial assets included in virtual wallet 36 has an associated assigned value. In one example, virtual credit account 40, virtual checking account 42, and virtual currency account 44 may have assigned values equal an amount of funds available for use in the accounts. In another example, virtual stock certificate 46 and virtual property title 48 may have assigned values equal to an assessed value of the asset. In a further example, ID document 50 may have an assigned value equal to a replacement cost for the ID document. The value of virtual wallet 36 is equal to the sum of the individual assigned values of the plurality of virtual financial assets included in virtual wallet 36. Virtual wallet unit 18 records the value of virtual wallet 36, e.g., virtual wallet unit 18 may store the value in storage units 28. For example, computing device 12 may execute the smart contracts for the virtual financial assets to establish the individual assigned values of the virtual financial assets included in virtual wallet 36 and to establish the value of virtual wallet 36.

Transaction unit 30 of virtual wallet unit 18 is configured to perform online transactions using one or more of the virtual financial assets included in virtual wallet 36. In one example, transaction unit 30 may facilitate the purchase of goods or services using virtual wallet 36 via either a website or a point-of-sale device configured to receive online payments. For example, upon receiving a request from a merchant for the purchase of goods, transaction unit 30 of virtual wallet unit 18 may send details of the request, e.g., the price of the goods and the merchant's name and location, to financial institution server 16 of the financial institution. In response, transaction unit 30 may receive authorization from financial institution server 16 of the financial institution to perform the requested transaction using one of the virtual financial assets included in virtual wallet 36. In some cases, the financial institution may authorize one or more of the virtual financial assets included in virtual wallet 36 to complete the requested transaction. In this case, the user of computing device 12 may select a preferred one of the authorized virtual financial assets to complete the transaction. In other cases, the financial institution may provide authentication for only a specific one of the virtual financial assets to complete the requested transaction. In either case, upon receiving authorization from the financial institution, transaction unit 30 then communicates with the merchant to complete the requested transaction.

In another example, transaction unit 30 may facilitate the transfer of funds from virtual wallet 36 to another person or entity. In a further example, transaction unit 30 may facilitate the sale or transfer of one or more of the virtual financial assets included in virtual wallet 36. In these examples, transaction unit 30 may operate substantially similar as described above to request and receive authentication for the transactions from the financial institution.

According to the disclosed techniques, insurance unit 34 of virtual wallet unit 18 is configured to establish an insurance policy for virtual wallet 36 with an insurance company, and continuously track virtual wallet 36 in order to update the insurance policy. Once a user of computing device 12 sets up virtual wallet 36, insurance unit 34 may send a request to insurance server 14 of the insurance company to establish an insurance policy for virtual wallet 36. The insurance policy request may include details of virtual wallet 36, including account or other identifying information and the assigned values for each of the virtual financial assets included in virtual wallet 36. The insurance policy request also includes the value of virtual wallet 36.

In response to the insurance policy request and payment of a premium by the user of computing device 12, the insurance company may issue the requested insurance policy. Once the insurance policy is issued, insurance unit 34 may receive an indication from insurance server 14 of the insurance company that the insurance policy has been issued and has an insured amount based on the value of virtual wallet 36. In one example, the insurance policy may have an insured amount that is equal to the total value of virtual wallet 36. In other examples, the insurance policy may have an insured amount that is some percentage of the total value of virtual wallet 36, e.g., 80% of the value. In still other examples, the insurance policy may have an insured amount that is equal to the assigned value of at least one of the virtual financial assets included in virtual wallet 36.

Over time, the individual assigned values of the virtual financial assets included in virtual wallet 36 may change. For example, the amount of funds available for use in any of virtual credit account 40, virtual checking account 42, or virtual currency account 44 may decrease as goods or services are purchased or increase as more funds are deposited into the accounts. As another example, the assessed value of virtual stock certificate 46 or virtual property title 48 may change within a given day, month, or other period of time. When such a change occurs, virtual wallet unit 18 updates the value of virtual wallet 36, e.g., virtual wallet unit 18 records the update in storage units 28. For example, computing device 12 may execute the smart contracts for the virtual financial assets to update the individual assigned values of the virtual financial assets included in virtual wallet 36, and, in turn, to update the value of virtual wallet 36.

In one example, virtual wallet unit 18 may update the value of virtual wallet 36 after each transaction performed by transaction unit 30 that either reduces or increases an amount of funds available for use in credit account 40, checking account 42, or currency account 44. In another example, virtual wallet unit 18 may update the value of virtual wallet 36 on a periodic basis, e.g., once per day, once per month, or once per quarter, to reflect changes to the assessed values of stock certificate 46 or property title 48.

In accordance with the techniques of this disclosure, insurance unit 34 of virtual wallet unit 18 sends a message to insurance server 14 of the insurance company reporting the updated value of virtual wallet 36. For example, insurance unit 34 may send the message reporting the updated value of virtual wallet 36 after each transaction performed by transaction unit 30. In the example where the insurance company and the financial institution are the same entity, the message reporting the updated value of virtual wallet 36 to the insurance company may be a standalone message or may be included in a message already sent to the financial institution reporting successful completion of the transaction. In another example, insurance unit 34 may send the message reporting the updated value of virtual wallet 36 according to a periodic interval, e.g., once per day, once per month, one per quarter, or some other period of time.

In a further example, insurance unit 34 may send the message reporting the updated value of virtual wallet 36 once a user of computing device 12 reports to the insurance company that virtual wallet 36 has been compromised. In the example where an unauthorized person accesses virtual wallet 36 or where computing device 12 is lost, stolen, or accessed by an unauthorized person, insurance unit 34 may be configured to still send the message reporting the updated value of virtual wallet 36. For example, insurance server 14 of the insurance company may send a query to computing device 12 requesting the updated value of virtual wallet 36. In the example where computing device 12 is destroyed, insurance unit 34 within computing device 12 may be unable to send the message to the insurance company. Instead, the insurance company via insurance server 14 may need to determine the updated value of virtual wallet 36 from the financial institution.

In response to the reported updated value of virtual wallet 36, the insurance company may update the insured amount of the insurance policy for virtual wallet 36. In this way, the insurance policy for virtual wallet 36 accurately reflects a current monetary value of virtual wallet 36. Once the insurance policy is updated, insurance unit 34 may receive an indication from insurance server 14 of the insurance company that the insured amount of the insurance policy has been updated based on the updated value of virtual wallet 36. In some examples, computing device 12 may execute the smart contracts for the virtual financial assets to facilitate the transaction of updating the value of virtual wallet 36 with insurance server 14 of the insurance company.

Virtual wallet 36 may be compromised when an unauthorized person accesses virtual wallet 36 or when computing device 12 is lost, stolen, destroyed, or accessed by an unauthorized person. Upon virtual wallet 36 being compromised, the user of computing device 12 may contact the insurance company to report the issue and make a claim against the insurance policy for virtual wallet 36. The user of computing device 12 may then receive payment on the claim of the updated insured amount of the insurance policy.

Figure 3:
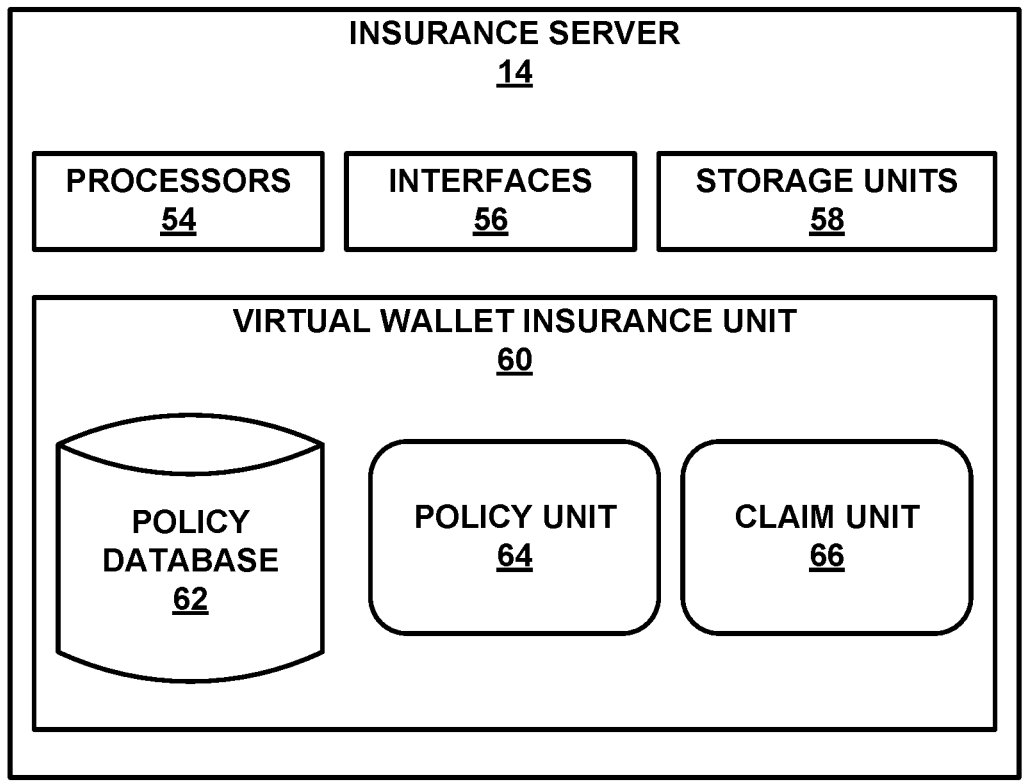
FIG. 3 is a block diagram illustrating an example insurance server including a virtual wallet insurance unit configured to manage an insurance policy for a virtual wallet stored on a computing device, in accordance with the techniques of this disclosure.

FIG. 3 is a block diagram illustrating an example of insurance server 14 including a virtual wallet insurance unit 60 configured to manage an insurance policy for virtual wallet 36 stored on computing device 12, in accordance with the techniques of this disclosure. The architecture of insurance server 14 illustrated in FIG. 3 is shown for exemplary purposes only and insurance server 14 should not be limited to this architecture. In other examples, insurance server 14 may be configured in a variety of ways.

Insurance server 14 is associated with an insurance company. In some examples, the insurance company may be part of a financial institution that supports virtual wallet unit 18 of computing device 12. Insurance server 14 may be part of a centralized or distributed system of one or more computing devices, such as such as desktop computers, laptops, workstations, wireless devices, network-ready appliances, file servers, print servers, or other devices.

As shown in the example of FIG. 3, insurance server 14 includes one or more processors 54, one or more interfaces 56, and one or more storage units 58. Insurance server 14 also includes virtual wallet insurance unit 60, which may be implemented as program instructions and/or data stored in storage units 58 and executable by processors 54 or implemented as one or more hardware units or devices of insurance server 14. Storage units 58 of insurance server 14 may also store an operating system executable by processors 54. The operating system stored in storage units 58 may control the operation of components of insurance server 14. Although not shown in FIG. 3, the components, units or modules of insurance server 14 are coupled (physically, communicatively, and/or operatively) using communication channels for inter-component communications. In some examples, the communication channels may include a system bus, a network connection, an inter-process communication data structure, or any other method for communicating data.

Processors 54, in one example, are configured to implement functionality and/or process instructions for execution within insurance server 14. For example, processors 54 may be capable of processing instructions stored by storage units 58. Processors 54 may include, for example, microprocessors, digital signal processors (DSPs), application specific integrated circuits (ASICs), field-programmable gate array (FPGAs), or equivalent discrete or integrated logic circuitry, or a combination thereof.

Storage units 58 may be configured to store information within insurance server 14 during operation. Storage units 58 may include a computer-readable storage medium or computer-readable storage device. In some examples, storage units 58 include one or more of a short-term memory or a long-term memory. Storage units 58 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 58 are used to store program instructions for execution by processors 54. Storage units 58 may be used by software or applications running on processors 54 of insurance server 14 (e.g., virtual wallet insurance unit 60) to temporarily store information during program execution.

Insurance server 14 may utilize interfaces 56 to communicate with external devices via one or more networks, e.g., network 10 from FIG. 1. Interfaces 56 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, insurance server 14 utilizes interfaces 56 to wirelessly communicate with an external device such as computing device 12 or financial institution server 16.

In the example illustrated in FIG. 3, virtual wallet insurance unit 60 of insurance server 14 includes a policy database 62, a policy unit 64, and a claim unit 66. According to the disclosed techniques, policy unit 64 of virtual wallet insurance unit 60 may establish insurance policies for virtual wallets with the associated insurance company. Policy database 62 may then maintain one or more virtual wallet insurance policies issued by the insurance company. For example, insurance server 14 may execute a smart contract for each of the virtual wallet insurance policies to establish, track, and update an insured amount of the insurance policies. The smart contracts may manage or facilitate elements of transactions between virtual wallet unit 18 of computing device 12 and virtual wallet insurance unit 60 of insurance server 14. A given virtual wallet insurance policy in policy database 62 may be for a virtual wallet account and/or for a computing device that stores the virtual wallet account. In this way, a user of the computing device may have insurance coverage regardless of whether the virtual wallet account itself is compromised or the computing device as a whole is compromised.

As one example, virtual wallet insurance unit 60 may receive a request for an insurance policy for virtual wallet 36 stored on computing device 12 from FIG. 2. The insurance policy request may include details of virtual wallet 36, including account or other identifying information and the assigned values for each of the virtual financial assets included in virtual wallet 36. The insurance policy request also includes the value of virtual wallet 36.

Policy unit 64 of virtual wallet insurance unit 60 then establishes the requested insurance policy for virtual wallet 36 with the insurance company. Upon payment of a premium by the user of computing device 12, the insurance company may issue the requested insurance policy for virtual wallet 36 having an insured amount based on the value of virtual wallet 36. For example, insurance server 14 may execute a smart contract for the virtual wallet insurance policy to establish the insured amount of the insurance policy. In one example, the insurance policy may have an insured amount that is equal to the value of virtual wallet 36. In other examples, the insurance policy may have an insured amount that is some percentage of the value of virtual wallet 36, e.g., 80% of the value. In still other examples, the insurance policy may have an insured amount that is equal to the assigned value of at least one of the virtual financial assets included in virtual wallet 36.

Policy unit 64 may store the issued insurance policy for virtual wallet 36 in policy database 62 with the insured amount based on the value of virtual wallet 36. In one example, policy database 62 may include a ledger associated with the insurance policy for virtual wallet 36. The ledger associated with the insurance policy may be a centralized ledger or a distributed ledger. In this example, policy unit 64 stores the insurance policy for virtual wallet 36 in policy database 62 by recording the insured amount of the insurance policy as an initial entry in the ledger. Virtual wallet insurance unit 60 of insurance server 14 may then send an indication to computing device 12 that the insurance policy has been issued and has an insured amount based on the value of virtual wallet 36.

As described in more detail above, the value of virtual wallet 36 on computing device 12 may be updated when a change occurs to the assigned value of at least one of the virtual financial assets included in virtual wallet 36. In accordance with the techniques of this disclosure, virtual wallet insurance unit 60 of insurance server 14 receives a message from computing device 12 reporting the updated value of virtual wallet 36. For example, virtual wallet insurance unit 60 may receive the message from computing device 12 reporting the updated value of virtual wallet 36 after each transaction performed using virtual wallet 36. In the example where the insurance company and the financial institution are the same entity, the message reporting the updated value of virtual wallet 36 may be a standalone message or may be included in a message already sent to the financial institution reporting successful completion of the transaction. In another example, virtual wallet insurance unit 60 may receive the message from computing device 12 reporting the updated value of virtual wallet 36 according to a periodic interval, e.g., once per day, month, quarter, or some other period of time.

In a further example, virtual wallet insurance unit 60 may receive the message from computing device 12 reporting the updated value of virtual wallet 36 along with a report from a user of computer device 12 that virtual wallet 36 has been compromised. In the example where an unauthorized person accesses virtual wallet 36 or where computing device 12 is lost, stolen, or accessed by an unauthorized person, virtual wallet insurance unit 60 may still receive the message reporting the updated value of virtual wallet 36 from computing device 12. For example, virtual wallet insurance unit 60 may send a query to computing device 12 requesting the updated value of virtual wallet 36. In the example where computing device 12 is destroyed, computing device 12 may be unable to send the message to virtual wallet insurance unit 60. Instead, virtual wallet insurance unit 60 may need to determine the updated value of virtual wallet 36 from the financial institution.

In response to receiving the message from computing device 12, policy unit 64 of virtual wallet insurance unit 60 may update the insured amount of the insurance policy for virtual wallet 36 based on the reported updated value of virtual wallet 36. For example, insurance server 14 may execute the smart contract for the virtual wallet insurance policy to update the insured amount of the insurance policy. As discussed above, policy database 62 may maintain the insurance policy for virtual wallet 36 by recording the initial insured amount of the insurance policy as an initial entry in a ledger associated with the insurance policy. The ledger associated with the insurance policy may be a centralized ledger or a distributed ledger. Policy unit 64 may then update the insured amount of the insurance policy for virtual wallet 36 by recording the updated insured amount of the insurance policy as a new entry in the ledger, without overwriting any previous entries in the ledger. The insured amount of the insurance policy for virtual wallet 36, therefore, may be managed in a manner that is similar to block chain technology.

In this way, the insurance policy for virtual wallet 36 stored in policy database 62 accurately reflects a current monetary value of virtual wallet 36. Once the insurance policy is updated, virtual wallet insurance unit 60 may send an indication to computing device 12 that the insured amount of the insurance policy has been updated based on the updated value of virtual wallet 36. In some examples, insurance server 14 may execute the smart contract for the virtual wallet insurance policy to facilitate the transaction of updating the insured amount of the insurance policy.

In some cases, virtual wallet insurance unit 60 of insurance server 14 may also validate the messages received from computing device 12 reporting the updated value of virtual wallet 36. This validation step may be used to ensure that the reported updated value of virtual wallet 36 is accurate and not falsified information. As one example, virtual wallet insurance unit 60 may receive a ledger of transactions performed using virtual wallet 36 from financial institution server 16 of the associated financial institution. The ledger may be received from financial institution server 16 on a periodic basis, e.g., daily, weekly, monthly, or quarterly. Virtual wallet insurance unit 60 may then validate the messages received from computing device 12 by comparing the reported updated value of virtual wallet 36 to the transactions in the ledger as an audit check. The messages received from computing device 12 may be validated when the updated value of virtual wallet 36 can be reconciled with the transactions in the ledger.

Virtual wallet 36 may be compromised when an unauthorized person accesses virtual wallet 36 or when computing device 12 is lost, stolen, destroyed, or accessed by an unauthorized person. Upon virtual wallet 36 being compromised, the user of computing device 12 may contact the insurance company to report the issue and make a claim against the insurance policy for virtual wallet 36. Claim unit 66 of virtual wallet insurance unit 60 may process the claim with the insurance company for payment of the updated insured amount of the insurance policy for virtual wallet 36 to the user of computing device 12. In some examples, insurance server 14 may execute the smart contract for the virtual wallet insurance policy to facilitate the transaction of processing the claim against the insurance policy.

In some cases, the user of computing device 12 may not immediately realize that virtual wallet 36 has been compromised. Financial institution server 16 of the financial institution, however, may be able to recognize suspicious or out-of-character behavior for the user, e.g. large purchases or transfers of funds, purchases from out-of-state merchants, or a lack purchases, that may indicate that virtual wallet 36 has been compromised. Financial institution server 16 may report this suspicious behavior to the user of computing device 12 for approval. If the user of computing device 12 does not approve the suspicious behavior, either the user of computing device 12 or financial institution server 16 may report the issue to insurance server 14 of the insurance company. The user of computing device 12 may then contact the insurance company to make a claim against the insurance policy for virtual wallet 36.

Figure 4:
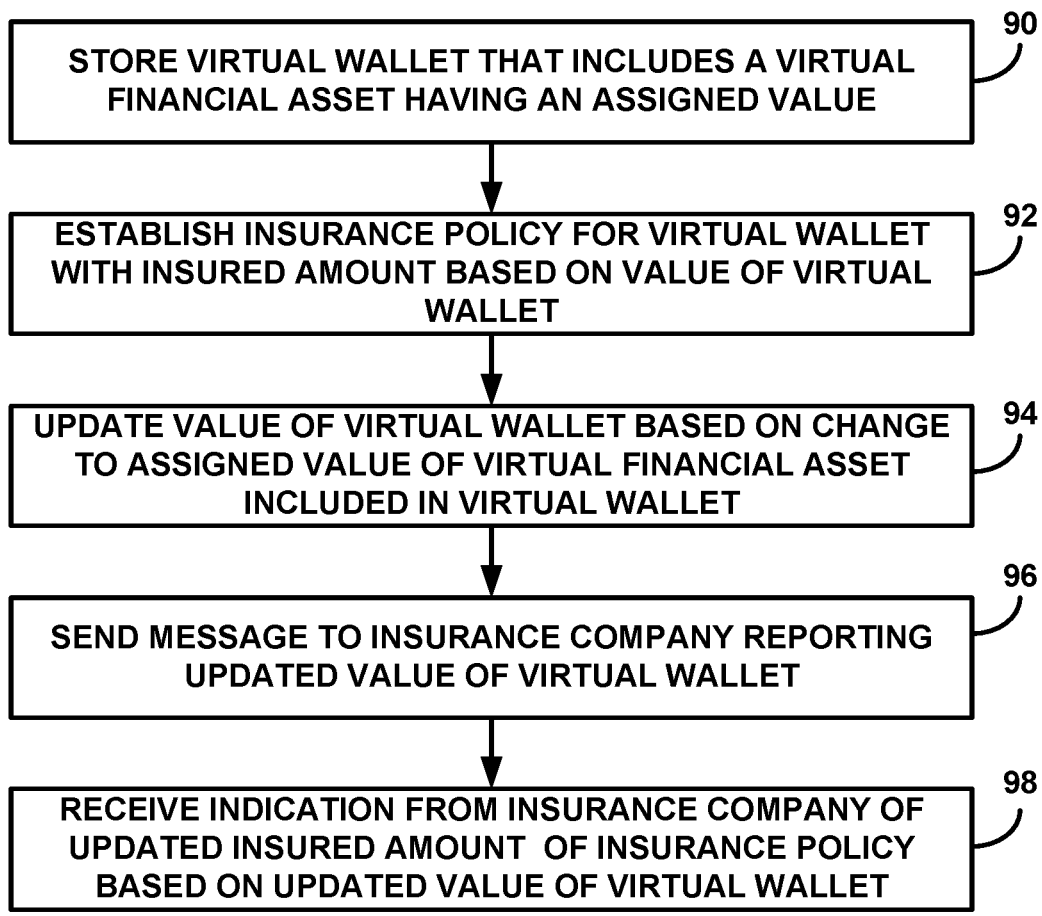
FIG. 4 is a flowchart illustrating an example operation of a computing device having an insured virtual wallet, in accordance with the techniques of this disclosure.

FIG. 4 is a flowchart illustrating an example operation of a computing device having an insured virtual wallet, in accordance with the techniques of this disclosure. The example operation of FIG. 4 is described with respect to computing device 12 having virtual wallet unit 18 from FIG. 2. Computing device 12 is a user device and, as illustrated in FIG. 1, is in communication with insurance server 14 associated with an insurance company and financial institution server 16 associated with a financial institution. In some examples, the financial institution and the insurance company may be the same entity.

Computing device 12 stores a virtual wallet 36 that includes at least one virtual financial asset having an assigned value (90). Virtual wallet unit 18 comprises an application executed by processors 24 of computing device 12 that allows a user of computing device 12 to perform online transactions using the virtual financial assets included in virtual wallet 36. Each of the virtual financial assets included in virtual wallet 36, e.g., virtual credit account 40, virtual checking account 42, virtual currency account 44, virtual stock certificate 46, virtual property title 48, and virtual identification document 50, corresponds to a financial asset held by a financial institution. Each of the virtual financial assets included in virtual wallet 36 has an associated assigned value. In the example illustrated in FIG. 2, virtual wallet 36 comprises a single virtual wallet account that includes the plurality of virtual financial assets having individual assigned values. In this example, the value of virtual wallet 36 is equal to the sum of the individual assigned values of the plurality of virtual financial assets.

According to the disclosed techniques, virtual wallet unit 18 communicates with an insurance company via insurance server 14 to establish an insurance policy for virtual wallet 36 having an insured amount based on the value of virtual wallet 36 (92). Virtual wallet unit 18 may establish the insurance policy by sending a request to the insurance company for the insurance policy that includes the value of virtual wallet 36. Upon payment of a premium for the insurance policy, virtual wallet unit 18 may receive an indication from the insurance company of the insured amount of the insurance policy based on the value of virtual wallet 36.

When a change occurs to the assigned value of at least one of the virtual financial assets included in virtual wallet 36, virtual wallet unit 18 updates the value of virtual wallet 36 (94). Virtual wallet unit 18 then sends a message to the insurance company via insurance server 14 reporting the updated value of virtual wallet 36 (96). For example, virtual wallet unit 18 may send the message reporting the updated value of virtual wallet 36 after each transaction performed by virtual wallet unit 18. In another example, virtual wallet unit 18 may send the message reporting the updated value of virtual wallet 36 according to a periodic interval, e.g., once per day, month, quarter, or some other period of time. In a further example, virtual wallet unit 18 may send the message reporting the updated value of virtual wallet 36 once a user of computing device 12 reports to the insurance company that virtual wallet 36 has been compromised. After sending the reporting message to the insurance company, virtual wallet unit 18 receives an indication from the insurance company of an updated insured amount of the insurance policy based on the updated value of virtual wallet 36 (98). In some examples, computing device 12 may execute smart contracts for the virtual financial assets included in virtual wallet 36 to facilitate the transaction of updating the value of virtual wallet 36 with insurance server 14 of the insurance company (94, 96, and 98).

Figure 5:
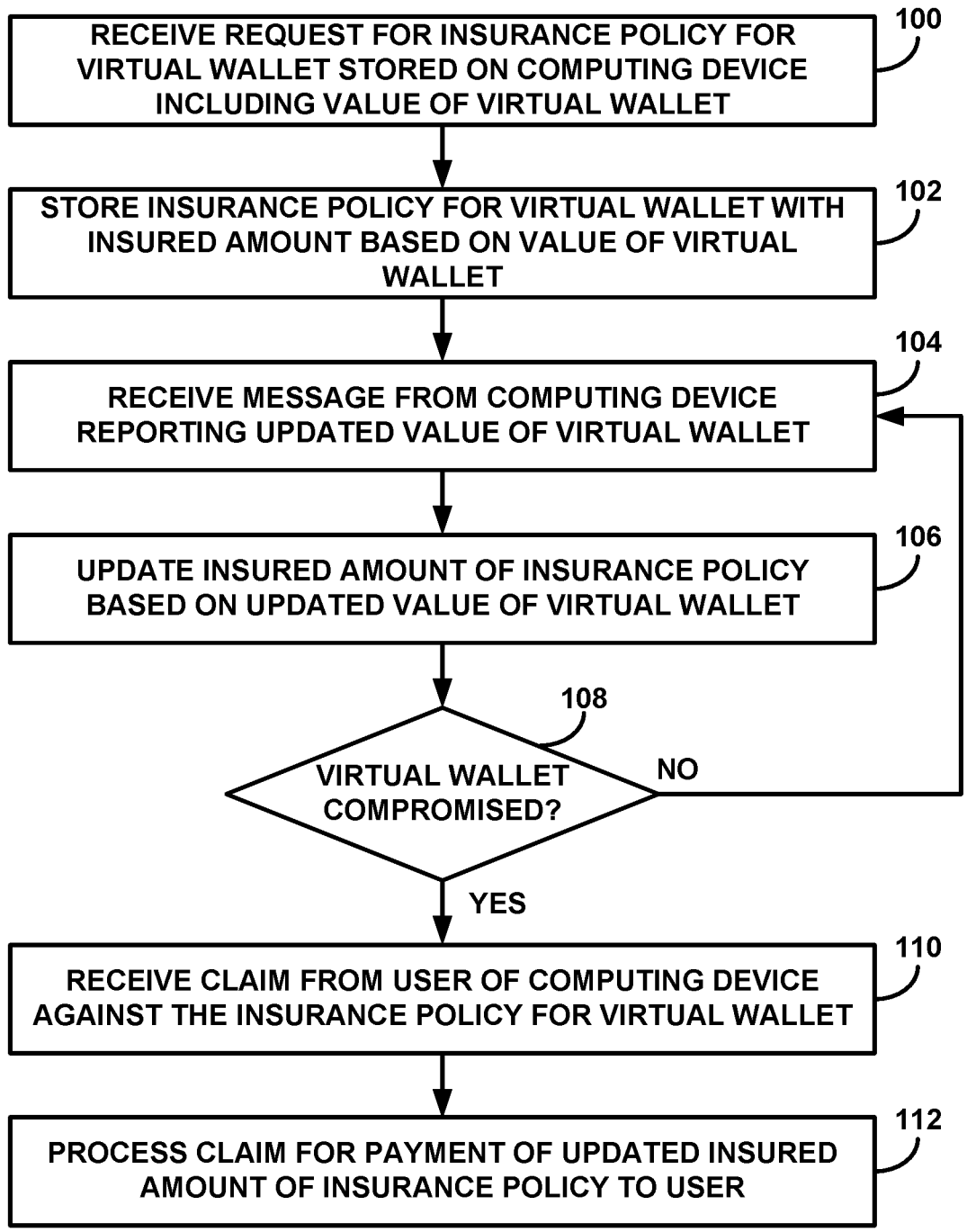
FIG. 5 is a flowchart illustrating an example operation of an insurance server managing an insurance policy for a virtual wallet, in accordance with techniques of this disclosure.

FIG. 5 is a flowchart illustrating an example operation of an insurance server managing an insurance policy for a virtual wallet, in accordance with techniques of this disclosure. The example operation of FIG. 5 is described with respect to insurance server 14 having virtual wallet insurance unit 60 from FIG. 3. Insurance server 14 is associated with an insurance company and, as illustrated in FIG. 1, is in communication with computing device 12 executing virtual wallet unit 18. In some examples, the insurance company may be a financial institution.

Insurance server 14 receives a request from computing device 12 for an insurance policy for virtual wallet 36 stored on computing device 12 with the request including a value of virtual wallet 36 (100). As described above, virtual wallet 36 includes at least one virtual financial asset having an assigned value that corresponds to a financial asset held by a financial institution. In the example illustrated in FIG. 2, virtual wallet 36 comprises a single virtual wallet account that includes a plurality of virtual financial assets having individual assigned values. In this example, the value of virtual wallet 36 is equal to the sum of the individual assigned values of the plurality of virtual financial assets.

In response to the request, policy unit 64 of virtual wallet insurance unit 60 establishes the requested insurance policy for virtual wallet 36 with the insurance company. Upon payment of a premium for the insurance policy, virtual wallet insurance unit 60 stores the insurance policy for virtual wallet 36 in policy database 62 with an insured amount based on the value of virtual wallet 36 (102). Insurance server 14 may send an indication to computing device 12 of the insured amount of the insurance policy for virtual wallet 36.

As described in more detail above, the value of virtual wallet 36 on computing device 12 may be updated when a change occurs to the assigned value of at least one of the virtual financial assets included in virtual wallet 36. Insurance server 14 receives a message from computing device 12 reporting the updated value of virtual wallet 36 (104). For example, insurance server 14 may receive the message from computing device 12 reporting the updated value of virtual wallet 36 after each transaction performed using virtual wallet 36. In another example, insurance server 14 may receive the message from computing device 12 reporting the updated value of virtual wallet 36 according to a periodic interval, e.g., once per day, month, quarter, or some other period of time. In a further example, insurance server 14 may receive the message from computing device 12 reporting the updated value of virtual wallet 36 along with a report from a user of computer device 12 that virtual wallet 36 has been compromised.

In response to the message from computing device 12, virtual wallet insurance unit 60 of insurance server 14 updates the insured amount of virtual wallet 36 based on the updated value of the virtual wallet (106). In one example, policy database 62 within insurance server 14 may include a ledger associated with the insurance policy for virtual wallet 36. The ledger associated with the insurance policy may be a centralized ledger or a distributed ledger. In this example, virtual wallet insurance unit 60 stores the insurance policy for virtual wallet 36 in policy database 62 by recording the insured amount of the insurance policy as an initial entry in the ledger. Virtual wallet insurance unit 60 may then update the insured amount of the insurance policy for virtual wallet 36 by recording the updated insured amount of the insurance policy as a new entry in the ledger, without overwriting any previous entries in the ledger. In this way, the insured amount of the insurance policy for virtual wallet 36 may be managed in a manner that is similar to block chain technology. In some examples, insurance server 14 may execute a smart contract for the virtual wallet insurance policy to facilitate the transaction of updating the insured amount of the insurance policy (104, 106).

Virtual wallet 36 may be compromised when an unauthorized person accesses virtual wallet 36 or when computing device 12 is lost, stolen, destroyed, or accessed by an unauthorized person. In the case where virtual wallet 36 running on computing device 12 has not been compromised (NO branch of 108), insurance server 14 continues to receive messages from computing device 12 reporting the updated value of virtual wallet 36 (104) and update the insured amount of the insurance policy based on the updated value of virtual wallet 36 (106). In the case where virtual wallet 36 running on computing device 12 is compromised (YES branch of 108), insurance server 14 may receive a claim from a user of computing device 12 against the insurance policy for the virtual wallet (110). In this case, claim unit 66 of virtual wallet insurance unit 60 may process the claim with the insurance company for payment of the updated insured amount of the insurance policy for virtual wallet 36 to the user of computing device 12 (112). In some examples, insurance server 14 may execute the smart contract for the virtual wallet insurance policy to facilitate the transaction of processing the claim against the insurance policy (110, 112).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What we claim is:

1. A method comprising:
   receiving, by an insurance server of an insurance company and from a computing device, a request for an insurance policy for a virtual wallet stored on the computing device, wherein the request includes a value of the virtual wallet, the value of the virtual wallet being equal to an assigned value of at least one virtual financial asset included in the virtual wallet;
   storing, by the insurance server, the insurance policy for the virtual wallet with an insured amount based on the value of the virtual wallet;
   receiving, by the insurance server and from the computing device, a message reporting an updated value of the virtual wallet, the updated value of the virtual wallet being based on changes to the assigned value of the at least one virtual financial asset included in the virtual wallet;
   receiving, by the insurance server, a ledger of transactions performed using the virtual wallet;
   validating, by the insurance server, the message received from the computing device reporting the updated value of the virtual wallet based on the ledger of transactions performed using the virtual wallet; and
   upon validating the message, updating, by the insurance server, the insured amount of the insurance policy based on the updated value of the virtual wallet.

2. The method of claim 1, further comprising:
   upon the virtual wallet being compromised, receiving, by the insurance server and from a user of the computing device, a claim against the insurance policy for the virtual wallet; and
   processing, by the insurance server, the claim for payment of the updated insured amount of the insurance policy to the user of the computing device.

3. The method of claim 1, wherein validating the message received from the computing device comprises:
   comparing, by the insurance server, the reported updated value of the virtual wallet to the transactions performed using the virtual wallet included in the ledger of transactions; and
   validating the message upon reconciling the reported updated value of the virtual wallet with the transactions performed using the virtual wallet included in the ledger of transactions.

4. The method of claim 3, wherein the reported updated value of the virtual wallet is reconciled with the transactions included in the ledger of transactions when the reported updated value of the virtual wallet substantially matches the value of the virtual wallet adjusted by a value of the transactions performed using the virtual wallet included in the ledger of transactions.

5. The method of claim 1, wherein the ledger of transactions is received on a periodic basis.

6. The method of claim 1,
   wherein the ledger of transactions comprises a first ledger;
   wherein storing the insurance policy for the virtual wallet comprises recording, by the insurance server, the insured amount of the insurance policy as an initial entry in a second ledger; and
   wherein updating the insured amount of the insurance policy comprises recording, by the insurance server, the updated insured amount of the insurance policy as a new entry in the second ledger.

7. The method of claim 1,
   wherein the virtual wallet comprises a single account that includes a plurality of virtual financial assets having individual assigned values, the value of the virtual wallet being equal to the sum of the individual assigned values of the plurality of virtual financial assets included in the virtual wallet; and
   wherein the insured amount of the insurance policy is equal to the value of the virtual wallet, and the updated insured amount of the insurance policy is equal to the updated value of the virtual wallet based on changes to one or more of the individual assigned values of the plurality of virtual financial assets.

8. The method of claim 1, wherein the at least one virtual financial asset included in the virtual wallet corresponds to a financial asset held by a financial institution, and wherein the ledger of transactions performed using the virtual wallet is received from the financial institution.

9. The method of claim 8, wherein the financial institution and the insurance company are the same entity.

10. An insurance server of an insurance company comprising:
one or more storage units configured to store virtual wallet insurance policies; and
one or more processors in communication with the one or more storage units and configured to:
receive a request from a computing device for an insurance policy for a virtual wallet stored on the computing device, wherein the request includes a value of the virtual wallet, the value of the virtual wallet being equal to an assigned value of at least one virtual financial asset included in the virtual wallet,
store the insurance policy for the virtual wallet in the one or more storage units with an insured amount based on the value of the virtual wallet,
receive a message from the computing device reporting an updated value of the virtual wallet, the updated value of the virtual wallet being based on changes to the assigned value of the at least one virtual financial asset included in the virtual wallet;
receive a ledger of transactions performed using the virtual wallet;
validate the message received from the computing device reporting the updated value of the virtual wallet based on the ledger of transactions performed using the virtual wallet; and
upon validating the message, update the insured amount of the insurance policy based on the updated value of the virtual wallet.

11. The insurance server of claim 10, wherein the one or more processors are configured to:
upon the virtual wallet being compromised, receive, from a user of the computing device, a claim against the insurance policy for the virtual wallet; and
process the claim for payment of the updated insured amount of the insurance policy to the user of the computing device.

12. The insurance server of claim 10, wherein to validate the message received from the computing device, the one or more processors are configured to:
compare the reported updated value of the virtual wallet to the transactions performed using the virtual wallet included in the ledger of transactions; and
validate the message upon reconciling the reported updated value of the virtual wallet with the transactions performed using the virtual wallet included in the ledger of transactions.

13. The insurance server of claim 12, wherein the reported updated value of the virtual wallet is reconciled with the transactions included in the ledger of transactions when the reported updated value of the virtual wallet substantially matches the value of the virtual wallet adjusted by a value of the transactions performed using the virtual wallet included in the ledger of transactions.

14. The insurance server of claim 10, wherein the ledger of transactions is received on a periodic basis.

15. The insurance server of claim 10,
wherein the ledger of transactions comprises a first ledger;
wherein to store the insurance policy for the virtual wallet, the one or more processors are configured to record the insured amount of the insurance policy as an initial entry in a second ledger; and
wherein to update the insured amount of the insurance policy, the one or more processors are configured to record the updated insured amount of the insurance policy as a new entry in the second ledger.

16. The insurance server of claim 10,
wherein the virtual wallet comprises a single account that includes a plurality of virtual financial assets having individual assigned values, the value of the virtual wallet being equal to the sum of the individual assigned values of the plurality of virtual financial assets included in the virtual wallet; and
wherein the insured amount of the insurance policy is equal to the value of the virtual wallet, and the updated insured amount of the insurance policy is equal to the updated value of the virtual wallet based on changes to one or more of the individual assigned values of the plurality of virtual financial assets.

17. The insurance server of claim 10, wherein the at least one virtual financial asset included in the virtual wallet corresponds to a financial asset held by a financial institution, and wherein the ledger of transactions performed using the virtual wallet is received from the financial institution.

18. The insurance server of claim 17, wherein the financial institution and the insurance company are the same entity.

19. A computer-readable medium storing instructions that, when executed, cause one or more processors to:
receive, from a computing device, a request for an insurance policy for a virtual wallet stored on the computing device, wherein the request includes a value of the virtual wallet, the value of the virtual wallet being equal to an assigned value of at least one virtual financial asset included in the virtual wallet;
store the insurance policy for the virtual wallet with an insured amount based on the value of the virtual wallet;
receive, from the computing device, a message reporting an updated value of the virtual wallet, the updated value of the virtual wallet being based on changes to the assigned value of the at least one virtual financial asset included in the virtual wallet;
receive a ledger of transactions performed using the virtual wallet;
validate the message received from the computing device reporting the updated value of the virtual wallet based on the ledger of transactions performed using the virtual wallet; and
upon validating the message, update the insured amount of the insurance policy based on the updated value of the virtual wallet.

20. The computer-readable medium of claim 19, wherein to validate the message received from the computing device, the instructions further cause the one or more processors to:
compare the reported updated value of the virtual wallet to the transactions performed using the virtual wallet included in the ledger of transactions; and
validate the message upon reconciling the reported updated value of the virtual wallet with the transactions performed using the virtual wallet included in the ledger of transactions.

* * * * *